United States Patent
Imanishi et al.

(10) Patent No.: US 7,273,437 B2
(45) Date of Patent: Sep. 25, 2007

(54) TOROIDAL-TYPE CONTINUOUSLY VARIABLE TRANSMISSION

(75) Inventors: Takashi Imanishi, Kanagawa (JP); Yuji Shimomura, Kanagawa (JP)

(73) Assignee: NSK Ltd., Tokyo (JP)

( * ) Notice: Subject to any disclaimer, the term of this patent is extended or adjusted under 35 U.S.C. 154(b) by 172 days.

(21) Appl. No.: 11/063,534

(22) Filed: Feb. 24, 2005

(65) Prior Publication Data
US 2005/0197227 A1 Sep. 8, 2005

(30) Foreign Application Priority Data
Feb. 26, 2004 (JP) ............ P. 2004-050958

(51) Int. Cl.
*F16H 37/02* (2006.01)
(52) U.S. Cl. ............ 475/216; 476/12; 476/42
(58) Field of Classification Search ........... 475/207, 475/214, 215, 216, 219; 476/40, 42, 12
See application file for complete search history.

(56) References Cited

U.S. PATENT DOCUMENTS

| | | | |
|---|---|---|---|
| 4,872,371 A | 10/1989 | Fellows | |
| 5,607,372 A | 3/1997 | Lohr | |
| 6,099,431 A | 8/2000 | Hoge et al. | |
| 6,251,039 B1 | 6/2001 | Koga | |
| 6,517,461 B2 * | 2/2003 | Shimizu | 475/216 |
| 6,585,619 B2 | 7/2003 | Henzler | |
| 6,663,471 B2 | 12/2003 | Kamamura et al. | |
| 2002/0028722 A1 * | 3/2002 | Sakai et al. | 475/214 |
| 2003/0224895 A1 | 12/2003 | Miyata et al. | |
| 2003/0228952 A1 * | 12/2003 | Joe et al. | 476/10 |
| 2004/0058772 A1 * | 3/2004 | Inoue et al. | 475/207 |

FOREIGN PATENT DOCUMENTS

| | | |
|---|---|---|
| JP | 6-174033 A | 6/1994 |
| JP | 8-159229 A | 6/1996 |
| JP | 11-63139 A | 3/1999 |
| JP | 11-141637 A | 5/1999 |
| JP | 11-148543 A | 6/1999 |
| JP | 2000-271844 A | 10/2000 |
| JP | 2002-28818 A | 1/2002 |
| JP | 2002-48205 A | 2/2002 |
| JP | 2003-314646 A | 11/2003 |

* cited by examiner

*Primary Examiner*—Richard M. Lorence
*Assistant Examiner*—Edwin A Young
(74) *Attorney, Agent, or Firm*—Sughrue Mion pllc.

(57) ABSTRACT

A toroidal-type continuously variable transmission has a casing, a rotation shaft, a pair of outer side disks having a side surface, supported on the rotation shaft, and rotating in synchronism with the rotation shaft, an inner side disk having two side surfaces, rotatably supported around a middle portion of the rotation shaft, and rotating relative to the rotation shaft, pluralities of supporting members disposed between the two side surfaces of the inner side disk and the side surfaces of the outer side disks, respectively, and swinging on a pivot shaft disposed so as to be twisted to the rotation shaft, and pluralities of power rollers rotatably supported on the respective supporting members, wherein an outer peripheral face of the inner side disk is provided with a detected portion for detecting rotation of the inner side disk.

2 Claims, 7 Drawing Sheets

TOROIDAL-TYPE CONTINUOUSLY VARIABLE TRANSMISSION

The present invention claims foreign priority to Japanese patent application no. P. 2004-050958, filed on Feb. 26, 2004, the contents of which is incorporated herein by reference.

BACKGROUND OF THE INVENTION

1. Field of the Invention

A toroidal-type continuously variable transmission according to the present invention is utilized as an automatic transmission apparatus for an automobile, or a transmission apparatus for controlling an operating speed of various industrial machines of a pump and the like.

2. Description of the Related Art

There is known and partially embodied a toroidal-type continuously variable transmission as a kind of a transmission apparatus constituting a kind of a transmission for an automobile. Further, there has been known various conventional continuously variable transmission apparatus each combined with a toroidal-type continuously variable transmission and a planetary gear type transmission. Further, in the various conventional variable transmission apparatus, there is also known a structure that an output side disk is provided with output-side side surfaces, of which a section is in a circular arc shape, at both side surfaces relative to an axial direction, and an input shaft is provided concentrically with a hollow rotating shaft as described in Japanese Patent Unexamined Publications Nos. JP-A-6-174033, JP-A-2002-48205 and JP-A-11-141637, U.S. Pat. No. 6,251,039, U.S. Pat. No. 6,585,619, U.S. Pat. No. 5,607,372 and U.S. Pat. No. 6,099,431 and U.S. Patent Unexamined Publication U.S. 2003/0224895A1.

Figure 7:
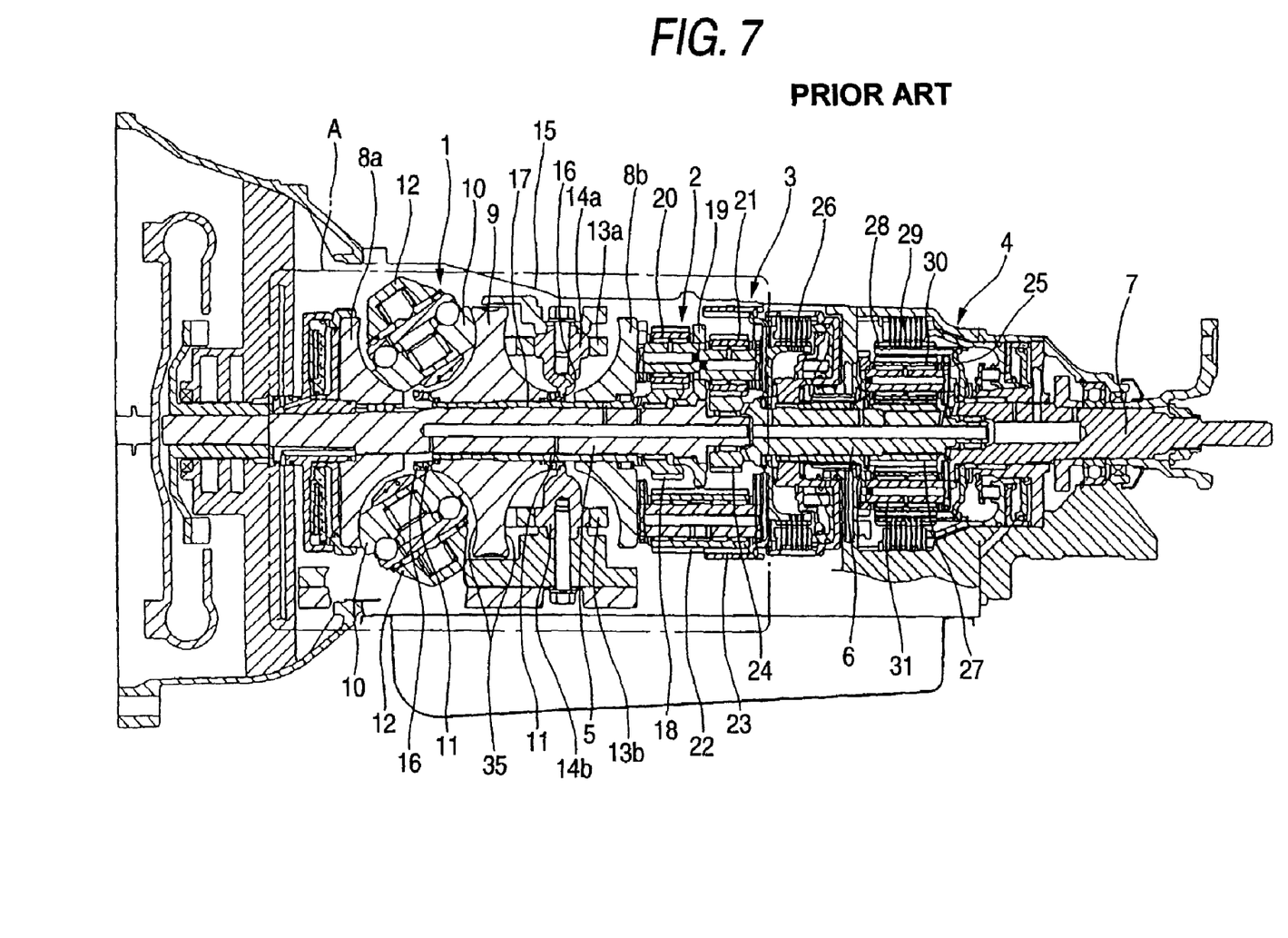
FIG. 7 is a sectional view showing an example of a continuously variable transmission apparatus integrated with a toroidal-type continuously variable transmission known in a related art.
Figure 8:
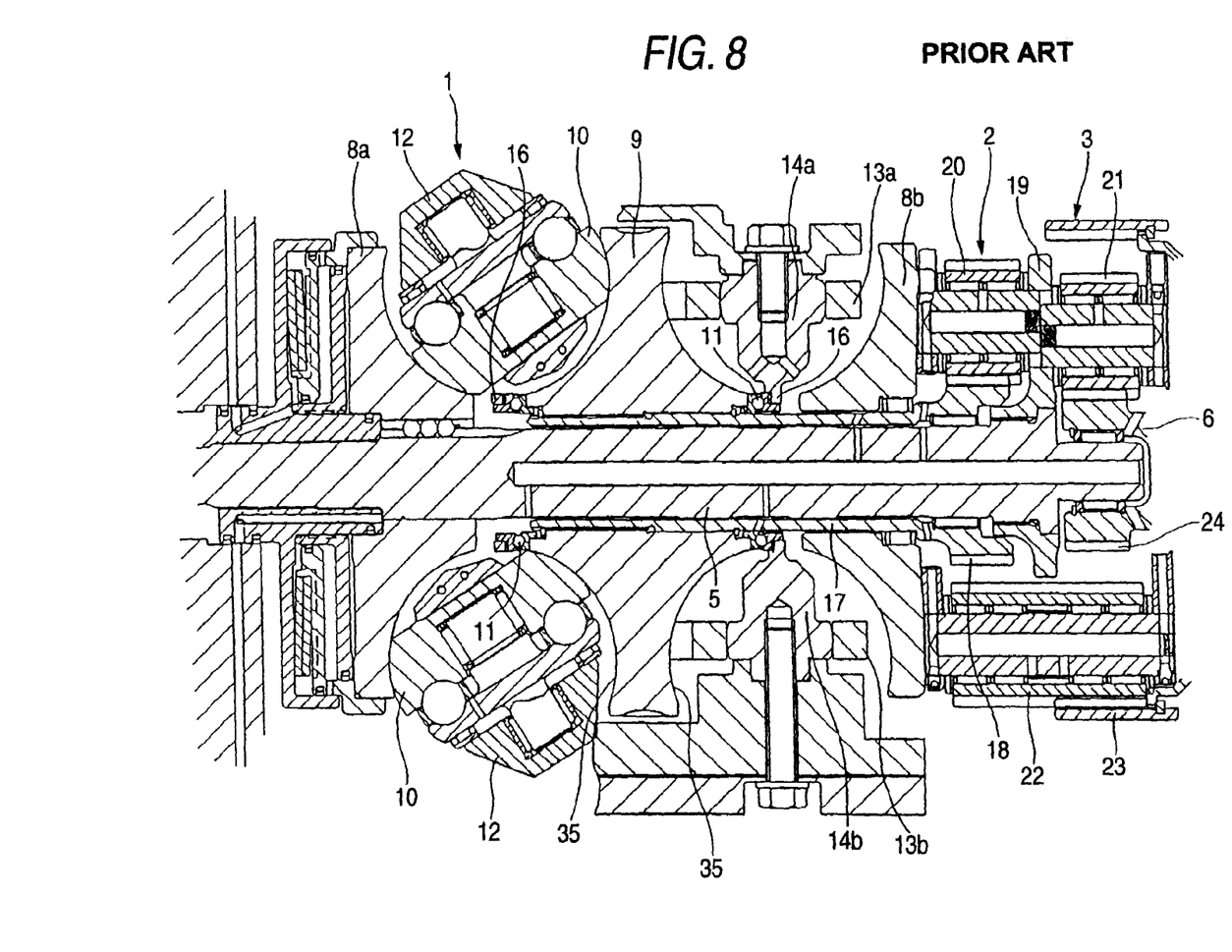
FIG. 8 is a view enlarging a portion A of FIG. 7.

FIGS. 7 through 8 show a continuously variable transmission apparatus described in U.S. 2003/0224895A1. First, a continuously variable transmission apparatus of the related art will be explained. In FIGS. 7 through 8, positions of sections of one cavity and another cavity differ from each other by 90 degrees relative to a circumferential direction. The continuously variable transmission apparatus comprises a toroidal-type continuously variable transmission 1, first through third respective planetary gear type transmissions 2 through 4, an input shaft 5, a transmitting shaft 6 and an output shaft 7 supported concentrically and rotatably relative to each other. The first and second planetary transmissions 2, 3 are provided in a state of being hung between the input shaft 5 and transmitting shaft 6. The third planetary gear type transmission 4 is provided in a state of being hung between the transmitting shaft 6 and the output shaft 7, respectively.

The toroidal-type continuously variable transmission 1 includes a pair of input side disks 8a, 8b, an output side disk 9 of an integrated type and a plurality of power rollers, 10, 10. The two input side disks 8a, 8b are supported on two portions of the input shaft 5, which portions are separated from each other in an axial direction of the input shaft 5. The input side disks 8a, 8b are concentric with one another and rotate in a synchronized manner. Additionally, the input side disks 8a, 8b, are disposed so that side faces thereof in the axial direction are arc shaped, and are opposed to each other. The output side disk 9 is supported on a middle portion of the input shaft 5 and between the two input side disks 8a, 8b so as to be concentric with the two input side disks 8a, 8b and to rotate relative to the two input side disks 8a, 8b. The side faces of the output side disk 9 in the axial direction have a section that is in an arc shape, and are opposed to respective ones of the side faces of the input side disks 8a, 8b.

Pluralities of the respective power rollers 10, 10 are pinched between the side faces in the axial direction of the output side disk 9 and the one side face in the axial direction of the input side disks 8a, 8b to be able to transmit power from the two input side disks 8a, 8b to the output side disk 9. The respective power rollers 10, 10 are rotatably supported respectively on inner side faces of trunnions 12, 12 constituting supporting members. Pivot shafts provided at both end portions of the respective trunnions 12, 12 are supported by supporting plates 13a, 13b swingably and displaciably in the axial directions. Further, the two supporting plates 13a, 13b are supported by supporting posts 14a, 14b fixed to inside of a casing 15.

Both end portions in the axial direction of the output side disk 9 are rotatably supported by a pair of thrust angular ball bearings 11, 11. Accordingly, the pair of supporting posts 14a, 14b provided concentrically with each other are connected by holding rings 16, of which a shape is a circular ring, at an opposite side in radial direction of the input shaft 5. The input shaft 5 is inserted through inner sides of the holding rings 16. Further, the respective thrust angular ball bearings 11, 11 are provided between the respective holding rings 16, 16, which are provided in the respective cavities, and the both end faces in the axial direction of the output side disk 9.

The output side disk 9 is engaged with a base end portion (left end portions in FIGS. 7 through 8) of a hollow rotating shaft 17 by a spline. In addition, a rotational force of the output side disk 9 is made to be able to be outputted by inserting the hollow rotating shaft 17 through an inner side of the input side disk 8b on a side remote from an engine (right sides of FIGS. 7 through 8). Further, a first sun gear 18 for constituting the first planetary gear type transmission 2 is fixedly provided at a front end portion (right end portions of FIGS. 7 through 8) of the hollow rotating shaft 17 projected from an outer side face of the input side disk 8b.

Meanwhile, a first carrier 19 is provided to be hung between the input portion of a front end portion (right end portions of FIGS. 7 through 8) of the input shaft 5, which is projected from the hollow rotating shaft 17, and the input side disk 8b so as to rotate the input side disk 8b and the input shaft 5 synchronizingly with each other. Planetary gears 20 through 22 for constituting the first and the second planetary gear type transmissions 2, 3 each constituting a double pinion type are rotatably supported at positions of both side faces in an axial direction of the first carrier 19 having equal intervals in a circumferential direction (generally, positions of three to four portions). A first ring gear 23 is rotatably supported by a surrounding of one half portion (right half portions of FIGS. 7 through 8) of the first carrier 19.

In the respective planetary gears 20 through 22, the planetary gear 20 provided on an inner side in a radial direction of the first carrier 19, which is proximate to the toroidal-type continuously variable transmission 1 (proximate to left sides of FIGS. 7 through 8), meshes with the first sun gear 18. Further, the planetary gear 21 provided on an inner side in the radial direction of the first carrier 19 at a side remote from the toroidal-type continuously variable transmission 1 (right sides of FIGS. 7 through 8) meshes with a second sun gear 24 fixedly provided at a base end portion (left end portion of FIG. 7) of transmitting shaft 6. The remaining planetary gear 22 provided on an outer side in the radial direction of the first carrier 19 is made to be larger in an axial direction than the planetary gears 20, 21 provided on the inner side in an axial direction and meshes with the two gears 20, 21. Further, the remaining planetary gear 22 and the first ring gear 23 are brought in mesh with each other.

Meanwhile, a second carrier 25 for constituting the third planetary gear type transmission 4 is fixedly coupled to a base end portion (left end portion of FIG. 7) of the output shaft 7. Further, the second carrier 25 and the first ring gear 23 are coupled via a low speed clutch 26. Further, a third sun gear 27 is fixedly provided to a portion proximate to a front side (proximate to right ends of FIGS. 7 through 8) of the transmitting shaft 6. Further, a second ring gear 28 is arranged at a surrounding of the third sun gear 27. A high speed clutch 29 is provided between the second ring gear 28 and a fixed portion of the casing 15 or the like. A plurality of sets of planetary gears 30, 31 arranged between the second ring gear 28 and the third sun gear 27 are rotatably supported by the second carrier 25. The respective planetary gears 30, 31 are brought in mesh with each other, the planetary gear 30 provided on an inner side in a radial direction of the second carrier 25 is brought in mesh with the third sun gear 27, and the planetary gear 31 similarly provided on an outer side thereof is brought in mesh with the second ring gear 28, respectively.

In the case of the continuously variable transmission apparatus constituted as described above, power transmitted to the integral type output side disk 9 from the input shaft 5 via the input side disks 8a, 8b and the respective power rollers 10, 10 is outputted by way of the hollow rotating shaft 17. Further, in a low speed mode of connecting the low speed clutch 26 and disconnecting the high speed clutch 29, by changing transmission ratio of the toroidal-type continuously variable transmission 1, a rotational speed of the output shaft 7 is made to be able to be converted regularly and reversely by interposing a stationary state while making a rotational speed of the input shaft 5 constant. That is, under the state, a differential component disposed between the first carrier 19 rotated in a regular direction along with the input shaft 5 and the first sun gear 18 rotated in a reverse direction along with the hollow rotating shaft 17 is transmitted from the first ring gear 23 to the output shaft 7 via the low speed clutch 26 and the second carrier 25. Under the state, the output shaft 7 can be stopped by setting the transmission ratio of the toroidal-type continuously variable transmission 1 to a predetermined value, further the output shaft 7 can be rotated in a direction of moving back a vehicle by changing the transmission ratio of the toroidal-type continuously variable transmission 1 from the predetermined value to a speed increasing side. In contrast, the output shaft 7 can be rotated in a direction of moving forward the vehicle by changing the transmission ratio of the toroidal-type continuously variable transmission 1 from the predetermined value to a speed reducing side.

Further, in a high speed mode of disconnecting the low speed clutch 26 and connecting the high speed clutch 29, the output shaft 7 is rotated in the direction of moving forward the vehicle. That is, under the state, rotation of the planetary gear 20 of the first planetary gear type transmission 2 rotated in accordance with a differential component, which is disposed between the first carrier 19 rotated in a regular direction along with the input shaft 5 and the first sun gear 18 rotated in a reverse direction along with the hollow rotating shaft 17, is transmitted to the planetary gear 21 of the second planetary gear type transmission 3 via the other planetary gear 22, and the rotation of the planetary gear 20 rotate the transmitting shaft 6 via the second sun gear 24. Further, the second carrier 25 and the output shaft 7 coupled with the second carrier 25 are rotated in a forward moving direction by meshing among the third sun gear 27 provided at the front end of the transmitting shaft 6, the second ring gear 28 and the planetary gears 30, 31 constituting the third planetary gear type transmission 4 along with the sun gear 27. Under the state, the more changed the transmission ratio of the toroidal-type continuously variable transmission 1 to the speed increasing side, the faster the rotational speed of the output shaft 7 can be made.

When the toroidal-type continuously variable transmission is embodied including a case of constituting the continuously variable transmission apparatus by combining with the planetary transmission, it is necessary to monitor rotational speeds of respective portions for feeding back the rotational speeds to a controller for controlling the transmission ratio in order to monitor whether a desired transmission ratio is obtained. Particularly, in the case of the toroidal-type continuously variable transmission constituting the above-described continuously variable transmission apparatus, in connecting and disconnecting the two high speed and the low speed clutches 26, 29 for switching the low speed mode and the high speed mode, or in stopping the output shaft 7 while making the rotational speed of the input shaft 5 constant in the low speed mode, it is necessary to strictly restrict the transmission ratio of the toroidal-type continuously variable transmission 1. Meanwhile, since a number of parts are present at an inner portion of the toroidal-type continuously variable transmission, a space for installing a part for detecting the rotational speed is limited. Therefore, it is preferable to be able to constitute a structure for detecting the rotational speeds of the respective portions of the toroidal-type continuously variable transmission as compact as possible.

In view of such a situation, U.S. Pat. No. 6,099,431 describes a structure wherein recessed and projected portions for detecting the rotational speed are formed integrally with the input side disk, on the outer peripheral portion of the input side disk. However, in U.S. Pat. No. 6,099,431, although a structure for detecting the rotational speed of the input side disk is described, there is not described a structure for detecting the rotational speed of the integral type output side disk, in which both side faces in the axial direction are constituted by curved faces having a section in a circular arc shape for being respectively brought into rolling contact with peripheral faces of the power rollers. At a portion of installing such an integrated type output side disk, an extra space is small particularly at a surrounding thereof. Therefore, compact formation is requested for a structure for detecting the rotational speed of the output side disk more than that of the structure for detecting the rotational speed of the input side disk. In JP-A-11-141637, although there is described a structure formed with an output gear for outputting power at an outer peripheral edge portion of the integral type output side disk, it is not described to integrate a structure for detecting the rotational speed at that portion.

SUMMARY OF THE INVENTION

In view of the above-described situation, an object of the present invention is to provide a compact structure for detecting a rotational speed of an integral type output side disk in which both side faces in an axial direction are constituted by curved faces having a section in a circular arc shape for respectively being brought into rolling contact with a peripheral face of a power roller.

According to a first aspect of the present invention, there is provided a toroidal-type continuously variable transmission, comprising:

a casing;

a rotation shaft rotatably supported in the casing;

a pair of outer side disks having side face of which section is in arc shape of the rotation shaft, respectively, supported on the rotation shaft at two positions which are separated from each other in the axial direction so that the side faces thereof oppose to each other, and rotating in synchronism with the rotation shaft;

an inner side disk having two side faces of which sections are in arc shape, rotatably supported on a substantially middle portion of the rotation shaft so that the both side faces thereof oppose to the side faces of the outer side disks, respectively, and rotating in the rotation shaft;

pluralities of supporting members disposed between the both side faces of the inner side disk and the side faces of the outer side disks, respectively, and swinging on a pivot shaft disposed to be twisted to the rotation shaft; and pluralities of power rollers rotatably supported on the respective supporting members, and having spherical projected face of which peripheral surface rollably contacts with the both side faces of the inner side disk and the side faces of the outer side disks, wherein an outer peripheral face of the inner side disk is provided with a detected portion for detecting rotation of the inner side disk.

According to a second aspect of the present invention as set forth in the first aspect of the present invention, it is preferable that pluralities of recess portions are provided at a middle portion in the axial direction of the outer peripheral face intermittently in a circumferential direction as the detected portions.

According to a third aspect of the present invention as set forth in the second aspect of the present invention, it is preferable that a portion of the outer peripheral face of the inner side disk deviated from the plurality of recess portions is a single cylindrical face, and the single cylindrical face is a reference face for working the both side faces of the inner side disk.

According to a fourth aspect of the present invention as set forth in the first aspect of the present invention, it is preferable that pluralities of recess grooves are provided intermittently in a circumferential direction so as to be inclined to a center axis of the inner side disk as the detected portions.

According to a fifth aspect of the present invention as set forth in the fourth aspect of the present invention, it is preferable that both end portions of pairs of projected portions, which are defined between the respective recess grooves provided at the outer peripheral face, overlap each other in the axial direction of the inner side disk, top portions of the projected portions form a single cylindrical face when the inner side disk is viewed from the axial direction, and the single cylindrical face is a reference face for working both side faces of the inner side disk.

According to a sixth aspect of the present invention as set forth in the first aspect of the present invention, it is preferable that recess grooves are formed on an entire periphery of a middle portion in the axial direction of the outer peripheral face of the inner side disk, and encoder elements are held in the recess groove, and the recess grooves and the encoder elements form the detected portion.

According to a seventh aspect of the present invention as set forth in the sixth aspect of the present invention, it is preferable that portions of both end portions in the axial direction of the outer peripheral face of the inner side disk deviated from the recess groove are single cylindrical faces, and the single cylindrical face is a reference face for working both side faces of the inner side disk.

According to an eighth aspect of the present invention as set forth in the first aspect of the present invention, it is preferable that the toroidal-type continuously variable transmission further comprising:

a planetary gear type transmission having at least a carrier and a sun gear; and a hollow rotation shaft, wherein the rotation shaft functions as an input shaft, the pair of outer side disks function as the input side disks, the inner side disk functions as the output side disk, the carrier couples the input shaft with one of the input side disks, the sun gear is coupled with an end of the hollow rotation shaft, and the hollow rotation shaft is disposed surrounding the input shaft so as to be concentric with the input shaft and coupled with the output side disk.

According to a ninth aspect of the present invention as set forth in the second aspect of the present invention, it is preferable that the toroidal-type continuously variable transmission further comprising:

a planetary gear type transmission having at least a carrier and a sun gear; and a hollow rotation shaft, wherein the rotation shaft functions as an input shaft, the pair of outer side disks function as the input side disks, the inner side disk functions as the output side disk, the carrier couples the input shaft with one of the input side disks, the sun gear is coupled with an end of the hollow rotation shaft, and the hollow rotation shaft is disposed at surrounding of the input shaft so as to be concentric with the input shaft and coupled with the output side disk.

According to a tenth aspect of the present invention as set forth in the fourth aspect of the present invention, it is preferable that the toroidal-type continuously variable transmission further comprising:

a planetary gear type transmission having at least a carrier and a sun gear; and a hollow rotation shaft, wherein the rotation shaft functions as an input shaft, the pair of outer side disks function as the input side disks, the inner side disk functions as the output side disk, the carrier couples the input shaft with one of the input side disks, the sun gear is coupled with an end of the hollow rotation shaft, and the hollow rotation shaft is disposed surrounding the input shaft so as to be concentric with the input shaft and coupled with the output side disk.

According to an eleventh aspect of the present invention as set forth in the sixth aspect of the present invention, it is preferable that the toroidal-type continuously variable transmission further comprising:

a planetary gear type transmission having at least a carrier and a sun gear; and a hollow rotation shaft, wherein the rotation shaft functions as an input shaft, the pair of outer side disks function as the input side disks, the inner side disk functions as the output side disk, the carrier couples the input shaft with one of the input side disks, the sun gear is coupled with an end of the hollow rotation shaft, and the hollow rotation shaft is disposed surrounding the input shaft so as to be concentric with the input shaft and coupled with the output side disk.

According to a twelfth aspect of the present invention as set forth in the first aspect of the present invention, it is preferable that at least a recessed portion is formed on the outer peripheral face of the inner disk as the detected portion.

According to a thirteenth aspect of the present invention as set forth in the first aspect of the present invention, it is preferable that the recessed portions is formed on the substantially middle portion in the axial direction of the outer peripheral face of the inner side disk in a circumferential direction.

According to a fourteenth aspect of the present invention as set forth in the first aspect of the present invention, it is preferable that pluralities of the recessed portions are formed on the outer peripheral face of the inner side disk so as to be inclined to the axial direction.

According to a fifteenth aspect of the present invention as set forth in the first aspect of the present invention, it is preferable that the toroidal-type continuously variable transmission further comprising:

a detected element disposed in the recessed portion.

In the case of the toroidal-type continuously variable transmission of the present invention constituted as described above, there can be realized a compact structure constituting integrated type output side disk having two curved side faces in the axial direction, of which a section is in a circular arc shape, so that the two side faces rolling contacts with the peripheral face of the power roller for detecting a rotational speed of the output side disk.

DETAILED DESCRIPTION OF THE PREFERRED EMBODIMENTS

In embodying the present invention, preferably, a plurality of recess portions are provided at a middle portion in the axial direction of an outer peripheral face of the inner side disk intermittently in a circumferential direction. Further, a portion of the outer peripheral face deviated from the respective recess portions is made to constitute a single cylindrical face constituting a reference face for working the both side faces in the axial direction of the inner side disk.

Alternatively, the outer peripheral face of the inner side disk is provided with a plurality of recess grooves, respectively, which are inclined to a center axis of the inner side disk intermittently in the circumferential direction. Further, both end portions of pairs of projected portions for the respective recess grooves present by interposing the respective recess grooves are made to overlap each other in the axial direction of the inner side disk. Further, top portions of the respective projected portions constitute a single cylindrical face as a reference face for working the both side faces of the inner side disk when the inner side disk is viewed from the axial direction.

Alternatively, recess grooves are formed over an entire periphery of a middle portion in the axial direction of an outer peripheral face of the inner side disk. Further, an encoder element having a detected portion is held in the recess groove. Further, portions of the both end portions in the axial direction of the outer peripheral face of the inner side disk deviated from the recess grooves are made to constitute a single cylindrical face constituting a reference face for working the both side faces in the axial direction of the inner side disk.

When constituted in this way, the both side faces in the axial direction can be finished by ensuring the reference face in working the both side faces in the axial direction of the inner side disk while ensuring sufficient shape accuracy and dimensional accuracy without preparing an exclusive jig having a complicated shape.

Further, in embodying the present invention, preferably, the rotating shaft is made to constitute an input shaft, the pair of outer side disks are respectively made to constitute input side disks, and the input shaft and one of the input side disks are coupled via a carrier constituting the planetary gear type transmission. Further, the inner side disk is made to constitute an output side disk, and a sun gear constituting the planetary gear type transmission is provided at other end portion of a hollow rotating shaft arranged concentrically with the input shaft at a surrounding of the input shaft and coupled with one end portion of the output side disk.

In such a structure, whereas a space of installing a part for detecting the rotational speed of the output side disk is limited, there is increased a necessity of measuring a rotational speed of the output side disk in order to strictly control the transmission ratio of the toroidal-type continuously variable transmission. Therefore, a significance of embodying the present invention by the above-described structure is enhanced.

First Embodiment

Figure 1:
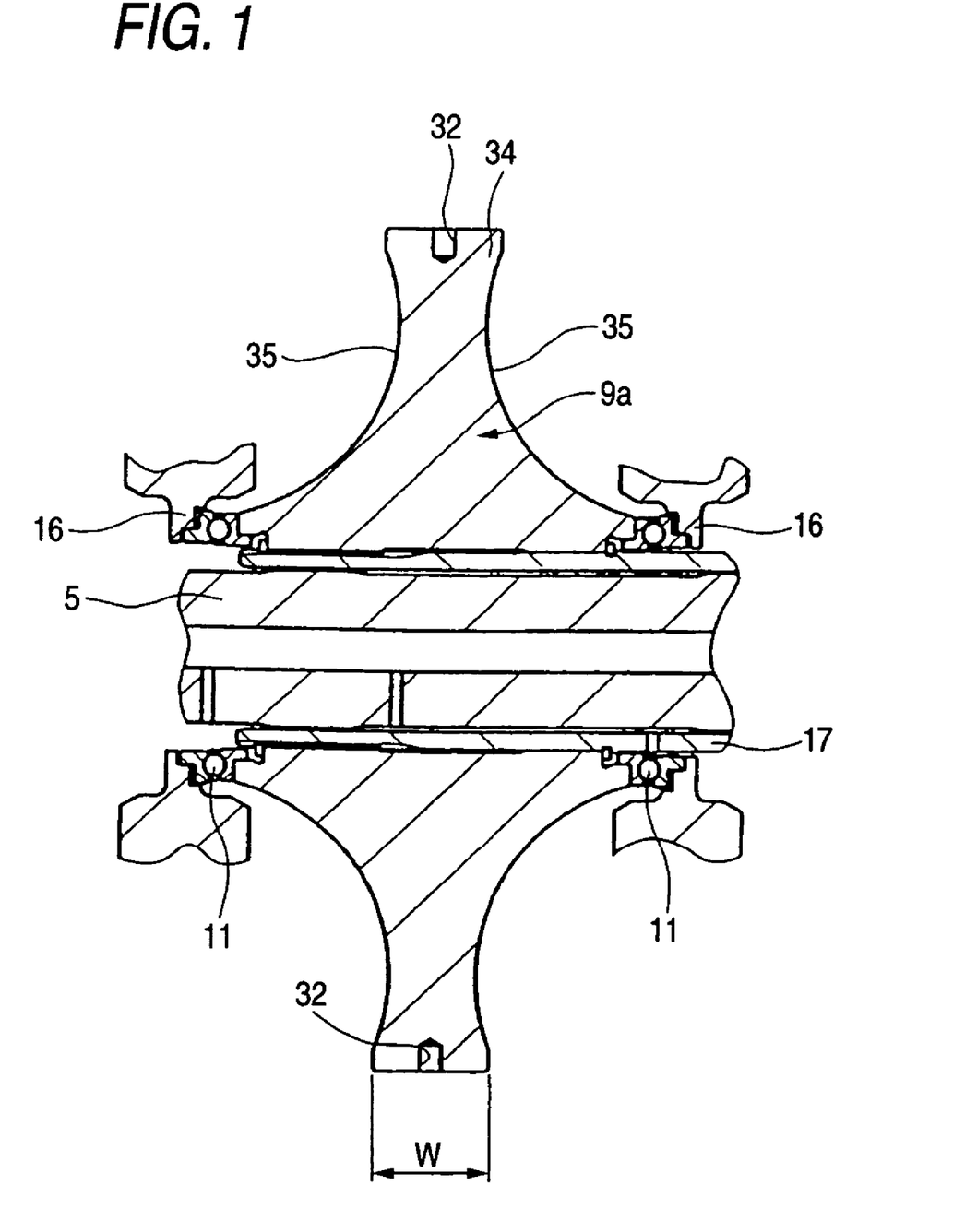
FIG. 1 is a sectional view of an essential portion showing a first embodiment of the present invention.
Figure 2:
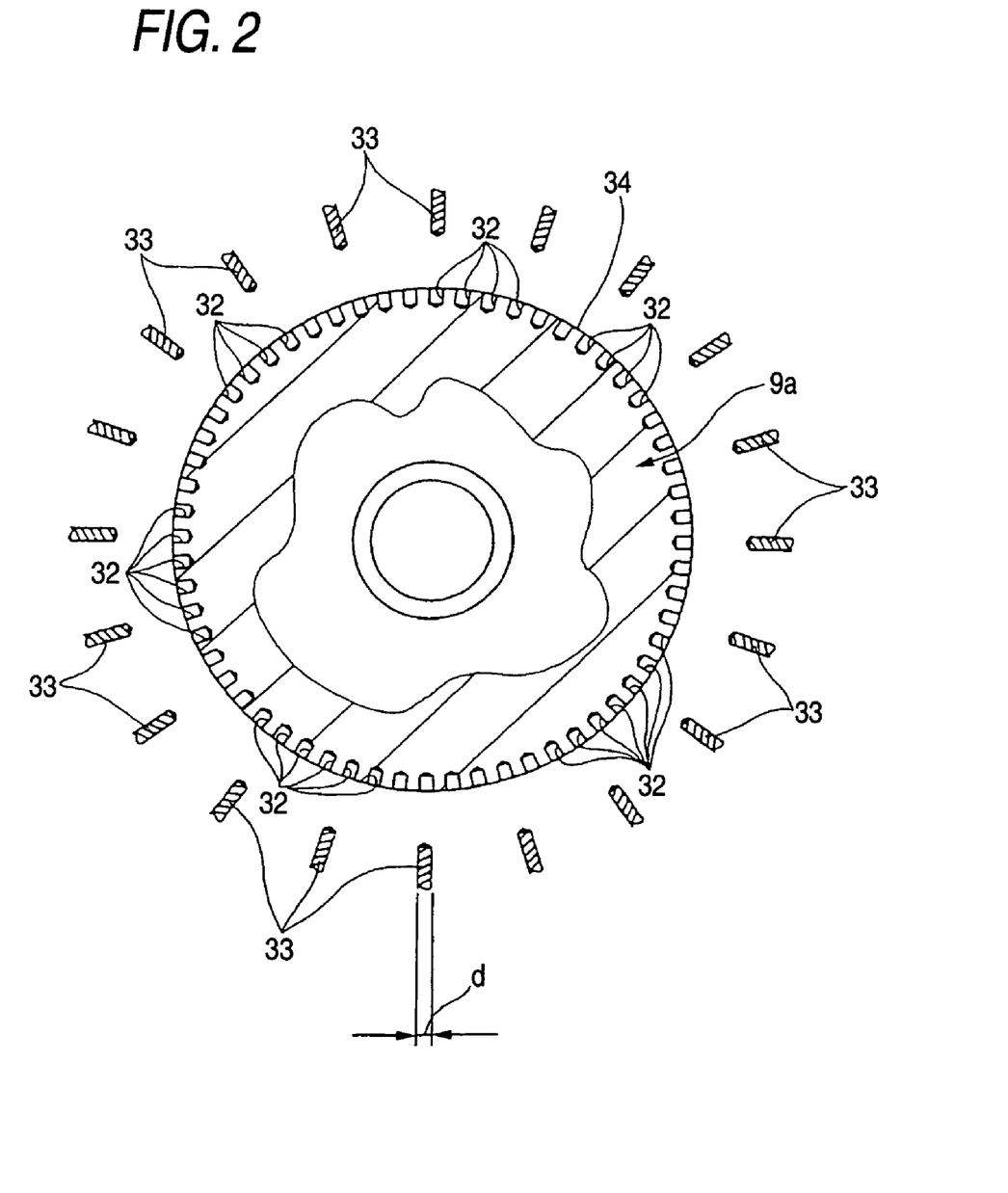
FIG. 2 is a sectional view showing a state of working a recess portion at the outer peripheral face of the output side disk.

FIGS. 1 through 2 show first embodiment of the present invention. A characteristic of the embodiment resides in that pluralities of recess portions 32, 32 are provided at a center portion in an axial direction of an outer peripheral face 34 of an output side disk 9a intermittently and at equal intervals in a circumferential direction in order to detect a rotational speed of the output side disk 9a constituting an inner disk. A structure of a toroidal-type continuously variable transmission integrated with the output side disk 9a and a structure of a continuously variable transmission apparatus integrated with the toroidal-type continuously variable transmission are similar to the structures of the related art illustrated in FIGS. 7 through 8 and therefore, an illustration as well as a detailed explanation thereof will be omitted or simplified and an explanation will be given of a characteristic portion of the present invention as follows.

Both end portions in the axial direction of the output side disk 9a are rotatably supported by the holding rings 16, 16 by the pair of thrust angular ball bearings 11, 11. A rotational force is made to be able to be outputted by the hollow rotating shaft 17 engaged with the inner peripheral face by a spline. A plurality (60 portions in the illustrated example) of recess portions 32, 32 are provided at the center portion in the axial direction of the outer peripheral face 34 of the output side disk 9a intermittently in the circumferential direction with having equal intervals. Each of the respective recess portions 32, 32 is a bottomed circular hole formed by drills 33, 33. Further, an outer diameter d of each of the drills 33, 33 is sufficiently smaller than a width w of the outer peripheral face 34 of the output side disk 9a (d<<w). Therefore, a large portion of the outer peripheral face 34 of the output side disk 9a constitutes a single cylindrical face. Particularly, both end portions in the axial direction thereof constitutes a cylindrical face continuous over an entire periphery thereof.

In a state of integrating the above-described output side disk 9a to the toroidal type continuously variable transmission, a detecting face of a rotation detecting sensor (not illustrated) of a magnetic type, an electrostatic capacitance type, or an eddy current type fixedly supported in the casing is made to be opposed to the center portion in the axial direction of the outer peripheral face of the output side disk 9a. Since the output side disk 9a is made of bearing steel or the like, which is a metal having magnetism and conductivity properties, various characteristics such as the magnetic property, an electrostatic capacitance property or the like of the center portion in the axial direction of the outer peripheral face 34 of the output side disk 9a are changed in turn in the circumferential direction at equal intervals. Therefore, by selecting the rotation detecting sensor having a pertinent structure, the rotational speed of the output side disk 9a can accurately be provided.

since both side faces 35, 35 in the axial direction of the output side disk 9a are faces of transmitting power by being brought into rolling contact with peripheral faces of the power rollers 10, 10 (refer to FIGS. 7 through 8), it is necessary not only to accurately restrict shape accuracy and dimensional accuracy but also to reduce surface roughness, in other word, it is necessary to obtain smooth faces. Therefore, in order to provide the output side disk 9a having excellent quality, it is important to select reference faces for finishing the both side faces 35, 35 in the axial direction. According to the embodiment of the present invention, a large portion of the outer peripheral face 34 of the output side disk 9a constitutes a single cylindrical face, particularly, the both end portions in the axial direction constitute the cylindrical faces continuous over the entire peripheries. Therefore, when the outer peripheral face 34 is properly worked before finishing the both side faces 35, 35 and the two side faces 35, 35 are finished by constituting a reference face by the outer peripheral face, shape accuracy, dimensional accuracy and surface roughness of the two side faces 35, 35 can be made to be proper.

A method of working the respective recess portions 32, 32 is not particularly limited. For example, in the case of forming the 60 portions of the respective recess portions 32, 32, the respective recess portions 32, 32 can be formed by a drilling press having a single piece of a drill and having a dividing angle of 6 degrees. Or, the 60 portions of the recess portions 32, 32 can also be formed in one motion by a working apparatus radially arranged with 60 pieces of drills. However, when working is carried out by the single piece drill, a working time period is prolonged. Alternatively, in the case of the working apparatus having 60 pieces of drills, the structure is complicated and the working apparatus becomes expensive.

In view of the above situation, in the case of the embodiment, the 60 portions of the recess portions 32, 32 are formed by a working apparatus radially arranged with 20 pieces of the drills 33, 33 at equal intervals (by a pitch of 18 degrees) and realizing a dividing angle of 6 degrees. According to the working apparatus, the 60 pieces of the recess portions 32, 32 can be formed by carrying out working by 3 times while rotating the output side disk 9a by 6 degrees. Therefore, it can be prevented that cost of the working apparatus is uselessly increased, or a working time period of the respective recess portions 32, 32 are uselessly prolonged.

Further, the respective recess portions 32, 32 can also be produced simultaneously (by plastic working) when a gross shape of the output side disk 9a is provided by applying plastic working of single motion working or the like to a material.

Second Embodiment

Figure 3:
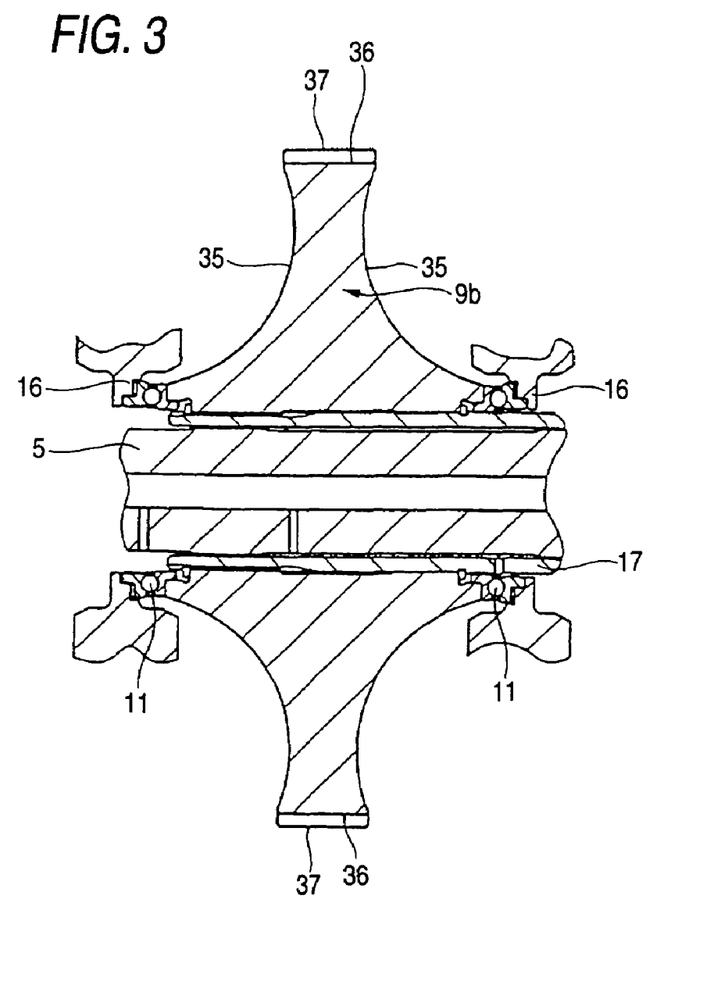
FIG. 3 is a sectional view of an essential portion showing a second embodiment of the present invention.
Figure 4:
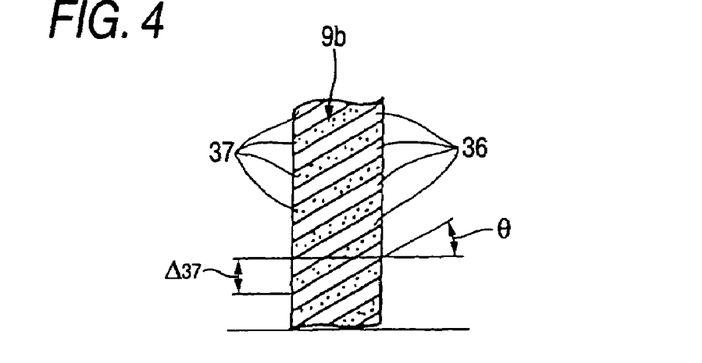
FIG. 4 is a development view showing a state of an outer peripheral face of an output side disk from an outer diameter side.

FIGS. 3 through 4 show second embodiment of the present invention. In the case of the embodiment, an outer peripheral face of an output side disk 9b constituting the inner side disk is provided with a plurality of recess grooves 36, 36 respectively inclined to the center axis of the output side disk 9b intermittently in the circumferential direction. In a state of integrating the above-described output side disk 9b to the toroidal-type continuously variable transmission, when the detecting face of the rotation detecting sensor (not illustrated) is made to be opposed to some portion of the outer peripheral face of the output side disk 9b (different from first embodiment, the portion is not limited to the center portion in the axial direction), the rotational speed of the output side disk 9a can accurately be provided.

Further, in the case of the embodiment, an inclination angle θ of the respective recess grooves 36, 36 is increased to some degree, both end portions of pairs of projected portions 37, 37 present by interposing the respective recess grooves 36, 36, represented by a dotted pattern area in FIG. 4 at the respective recess grooves 36, 36 are made to overlap each other by an amount of $\Delta_{37}$ of FIG. 4 in the axial direction of the output side disk 9b. Therefore, when the output side disk 9b is viewed from the axial direction (side directions of FIGS. 3 through 4), top portions of the respective projected portions 37, 37 constitute a single cylindrical face. That is, when the output side disk 9a is viewed from side directions of FIGS. 3 through 4, the outer peripheral shape becomes a regular circle which is not recessed over the entire periphery. Therefore, by using the top portions of the respective recess portions 37, 37 as a reference face for working the both side faces 35, 35 of the output side disk 9a, when the both side faces 35, 35 are finished, shape accuracy, dimensional accuracy and surface roughness of the both side faces 35, 35 can be made to be proper.

Further, although shapes of the respective recess grooves 36, 36 and the respective projected portions 37, 37 may be an involute shape, the shapes may be a shape of a simple rectangular groove or a circular arc groove shape since power is not transmitted particularly. However, since large force is exerted to the output side disk 9b in operating the toroidal-type continuously variable transmission, it is preferable that a portion having a small radius of curvature is not present at bottom portions of the respective recess grooves 36, 36 such that stress is not concentrated to the bottom portions of the respective recess grooves 36, 36. Therefore, it is preferable to constitute the respective recess grooves 36, 36 by a section in a circular arc shape.

Third Embodiment

Figure 5:
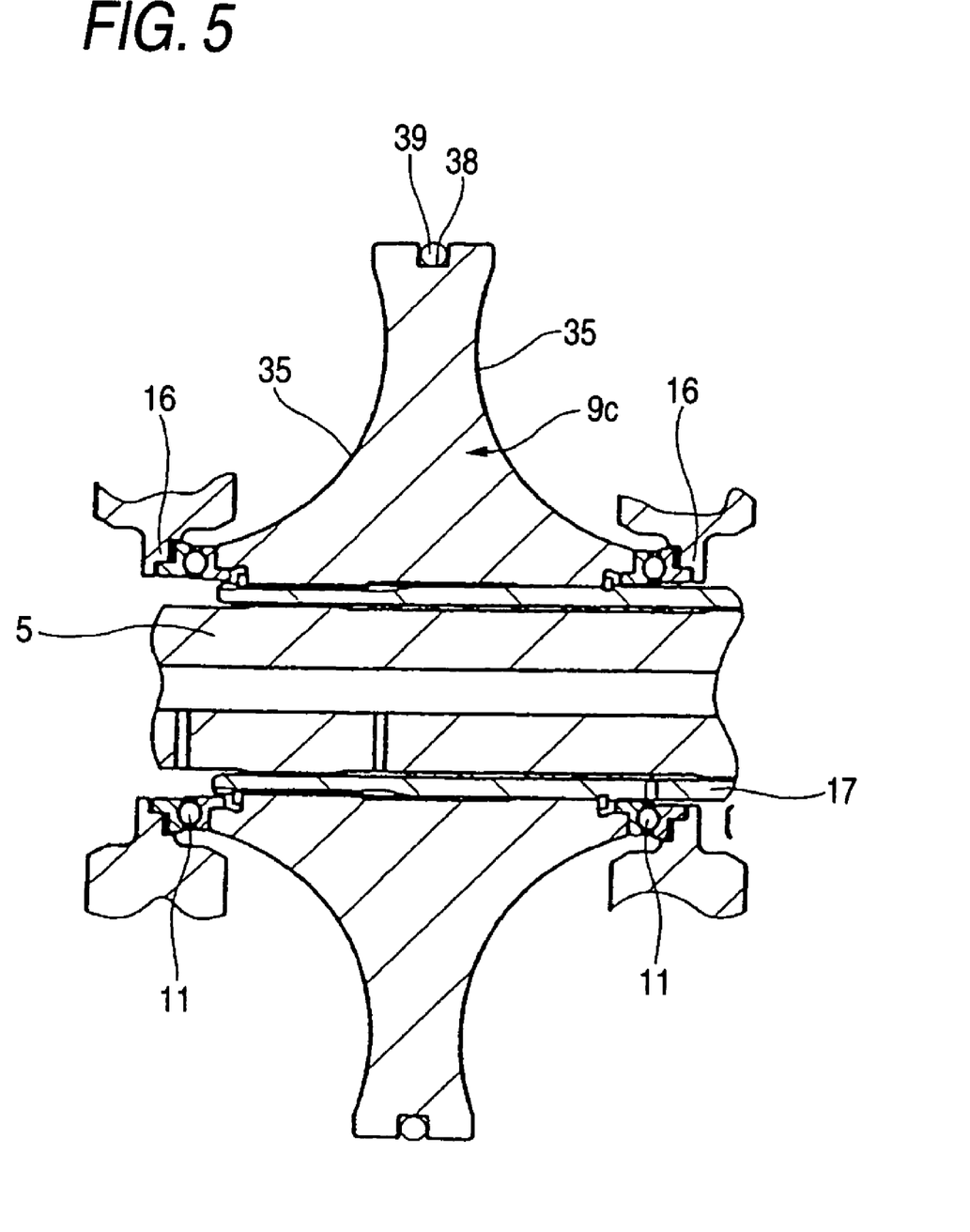
FIG. 5 is a sectional view of an essential portion showing a third embodiment of the present invention.
Figure 6A:
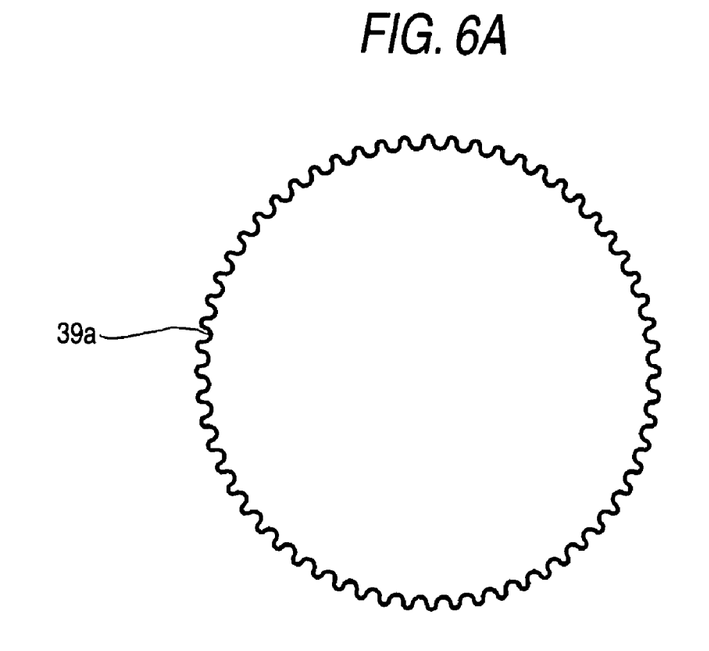
FIG. 6 illustrates sectional views showing two examples of encoder elements.
Figure 6B:
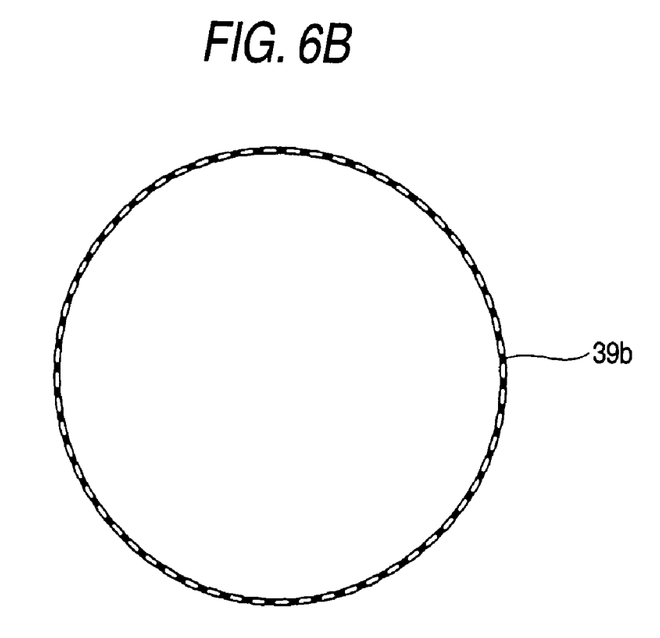

FIGS. 5 through 6 show third embodiment of the present invention. In the case of the embodiment, a recess groove 38 is formed over an entire periphery at a center portion in an axial direction of an outer peripheral face of an output side disk 9c constituting the inner side disk. Further, an encoder element 39 in ring shape having a detected portion is held in the recess groove 38. The encoder elements 39 having various structures can be used so far as the characteristics are changed alternately and at equal intervals in the circumferential direction in order to be able to detect the rotational speed by being combined with a rotation detecting sensor, not illustrated. For example, when combined with a rotation detecting sensor of a magnetism detecting type, an encoder element 39a formed with a magnetic metal material in a wavy shape as shown in FIG. 6A, or an encoder element 39b formed with a number of through holes as shown in FIG. 6B can be used. Or, although not illustrated, an encoder element made by a permanent magnet arranged with S poles and N poles alternately and at equal intervals at an outer peripheral face thereof can also be used. In cases of adopting any structures, in a state before being held in the recess groove 38, a portion of the encoder element 39 in the circumferential direction is made to be discontinuous and a diameter of the encoder element 39 is made to be able to be widened. The discontinuous portion is bonded by welding or adhering after having been held in the recess groove 38.

Also in the case of the embodiment, in a state of integrating the output side disk 9c holding the above-described encoder element 39 to the toroidal-type continuously variable transmission, when a detecting face of a rotation detecting sensor (not illustrated) is made to be opposed to the outer peripheral face of encoder element 39, the rotational speed of the output side disk 9c can accurately be provided. Further, in the case of the embodiment, when both side portions of the recess groove 38 are used as reference faces for working the both side faces 35, 35 of the output side disk 9c and the both side faces 35, 35 are finished, shape accuracy, dimensional accuracy and surface roughness of the both side faces 35, 35 can be made to be proper.

While there has been described in connection with the preferred embodiments of the present invention, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A continuously variable transmission comprising:
a casing;
a rotation shaft rotatably supported in the casing;
a pair of outer side disks each having a side face of which section is in arc shape, supported on the rotation shaft at two positions which are separated from each other in the axial direction so that the side faces thereof oppose to each other, wherein the outer side disks rotate in synchronism with the rotation shaft;
an inner side disk having two side faces of which sections are in arc shape, rotatably supported on a substantially middle portion of the rotation shaft so that the two side faces thereof oppose respective ones of the side faces of the outer side disks, and rotating on the rotation shaft;
pluralities of supporting members disposed between the two side faces of the inner side disk and the side faces of the outer side disks, respectively, and swinging on a pivot shaft disposed to be twisted relative to the rotation shaft; and
pluralities of power rollers rotatably supported on the respective supporting members, each having a spherical projected face of which a peripheral surface rollably contacts with one of the side faces of the inner side disk and one of the side faces of the outer side disks,
wherein an outer peripheral face of the inner side disk is provided with a detected portion for detecting rotation of the inner side disk,
wherein pluralities of recess grooves are provided intermittently in a circumferential direction so as to be inclined to a center axis of the inner side disk as the detected portions,
wherein both end portions of pairs of projected portions, which are defined between the respective recess grooves provided at the outer peripheral face, overlap each other in the axial direction of the inner side disk, and
top portions of the projected portions form a single cylindrical face when the inner side disk is viewed from the axial direction.

2. The continuously variable transmission according to claim 1, further comprising:
a planetary gear transmission having at least a carrier and a sun gear; and
a hollow rotation shaft,
wherein the rotation shaft functions as an input shaft,
the pair of outer side disks function as input side disks,
the inner side disk functions as an output side disk,
the carrier couples the input shaft with one of the input side disks,
the sun gear is coupled with an end of the hollow rotation shaft, and
the hollow rotation shaft surrounds the input shaft so as to be concentric with the input shaft and coupled with the output side disk.

* * * * *